Sept. 22, 1953 W. H. RUFFLE 2,653,178

THERMOCOUPLE DEVICE

Filed Oct. 10, 1951

INVENTOR
By: WILLIAM HARRY RUFFLE
Haseltine, Lake & Co.
AGENTS

Patented Sept. 22, 1953 2,653,178

UNITED STATES PATENT OFFICE 2,653,178

THERMOCOUPLE DEVICE

William Harry Ruffle, Hove, England, assignor to Speed Development Company Limited, Hove, England, a British company Application October 10, 1951, Serial No. 250,667
In Great Britain November 22, 1949

6 Claims. (Cl. 136—4)

This invention relates to thermo-couple devices adapted, in response to a change in ambient temperature to develop a low E. M. F. so as to produce a signal which can be utilised to set into operation electrical apparatus. In a known type of thermo-couple part of the assembly of couples is exposed for ready access thereto of the flame or equivalent localised abnormal temperature change producing cause, means screening the other part of the assembly of couples from direct exposure to the cause of abnormal temperature change, the latter couple being shrouded by means which exposes it in common with the exposed couple to free access thereto of the ambient air or gas.

An object of the present invention is to provide a thermo-couple device which is suitable for use in fields where a very high responsiveness to the effects due to a sudden change in ambient temperature is required and which will result in the device developing a low E. M. F. i. e., a few millivolts, which can be utilised instantly to set into operation electrical apparatus for giving a warning or for operating appropriate apparatus to enable the cause of the sudden change in temperature to be counteracted or remedied, or, of course as with aircraft, to enable appropriate action to be taken promptly following the outbreak of fire causing the sudden change in ambient temperature.

In certain fields of use of thermo-couples, e. g. for use in aircraft and other vehicles it is essential to have a thermo-couple device which, whilst being capable of ready connection in the desired circuit, will be adequately protected against weather and other exposed conditions, and as far as reasonably possible rendered foolproof. For example, it is essential to minimise as much as possible, or to avoid entirely, exposure of the leads where they are connected to the terminals of the thermo-couple, whereby fireproof insulation covering the leads will not be removed from the ends outside the actual points of connection of the leads to the terminals. That is to say the present practice of peeling or scraping away the insulation to expose the leads for connecting them to the contacts should be avoided. Most importantly it is essential to obviate short-circuiting due to exposed leads and terminals. The present invention achieves these desiderata.

Broadly the present invention is characterised in that in order to protect the conductors of the insulated leads and their points of connection to the couple elements from harmful ambient conditions, the thermo-couple device has the means for connecting said leads to said elements embedded in a fire resisting insulation said means including adjustable terminal elements having pointed parts to penetrate the insulation covering the leads and to make contact with the conductors of the leads.

According to one form of the present invention a thermo-couple device intended for use in exposed ambient conditions is provided with means to protect from said conditions the conductors of the leads to be connected to the couple elements and their points of connection to the said elements, said means comprising terminal members embedded in a fireproof insulating material said terminal members each receiving a terminal screw and being adapted to have the insulation covered leads guided therethrough in a direction transverse to the axis of the associated terminal screw, each said screw having a pointed end adapted to penetrate the insulation of the associated lead to make contact with the conductor of the lead.

According to a still further form of the present invention a thermo-couple device has one of the couple elements shrouded and the other one exposed so that the latter couple element is influenced in advance of the shrouded couple in the event of there being a sudden rise in the ambient temperature such as actual combustion, as distinct from gradual changes in temperature arising out of changes in weather conditions or changes in location of the aircraft or other body fitted with the thermo-couple, the exposed couple element being shielded against physical injury, and the couple elements being connected across terminals in an insulated base to which leads are connected for connecting the thermo-couple device to the appropriate electrically operated apparatus, the said terminals being embedded within the insulated base at the parts which receive the leads and including terminal screws adapted to penetrate the insulation of the leads so as to make contact with the wires therein without having to scrape or peel away the insulation from the leads to effect good electrical connection.

The means of the present invention provided for connecting the leads to the thermo-couple is of importance having regard to the fact that normally the thermo-couple would be located in an exposed position, as when fitted to various parts of an aircraft engine, and also the insulation on the said leads must afford the maximum protection for the lead wires against injury by combustion as well as by atmospheric conditions.

Hence, the conventional practice of scraping away a part of the insulation to engage the terminals with the wires is objectionable in many respects, bearing in mind the very high safety factor which must exist with a thermo-couple when it forms part of apparatus for giving a fire warning on aircraft.

In order that the invention may be clearly understood and readily carried into effect, drawings are appended hereto illustrating an embodiment thereof, and wherein, Figure 1 is an elevation showing unshrouded the thermo-couple device, the apertures for the insertion of the leads being indicated by positive and negative signs.

Figures 1, 2, 3, 4, 5, 6, 7:
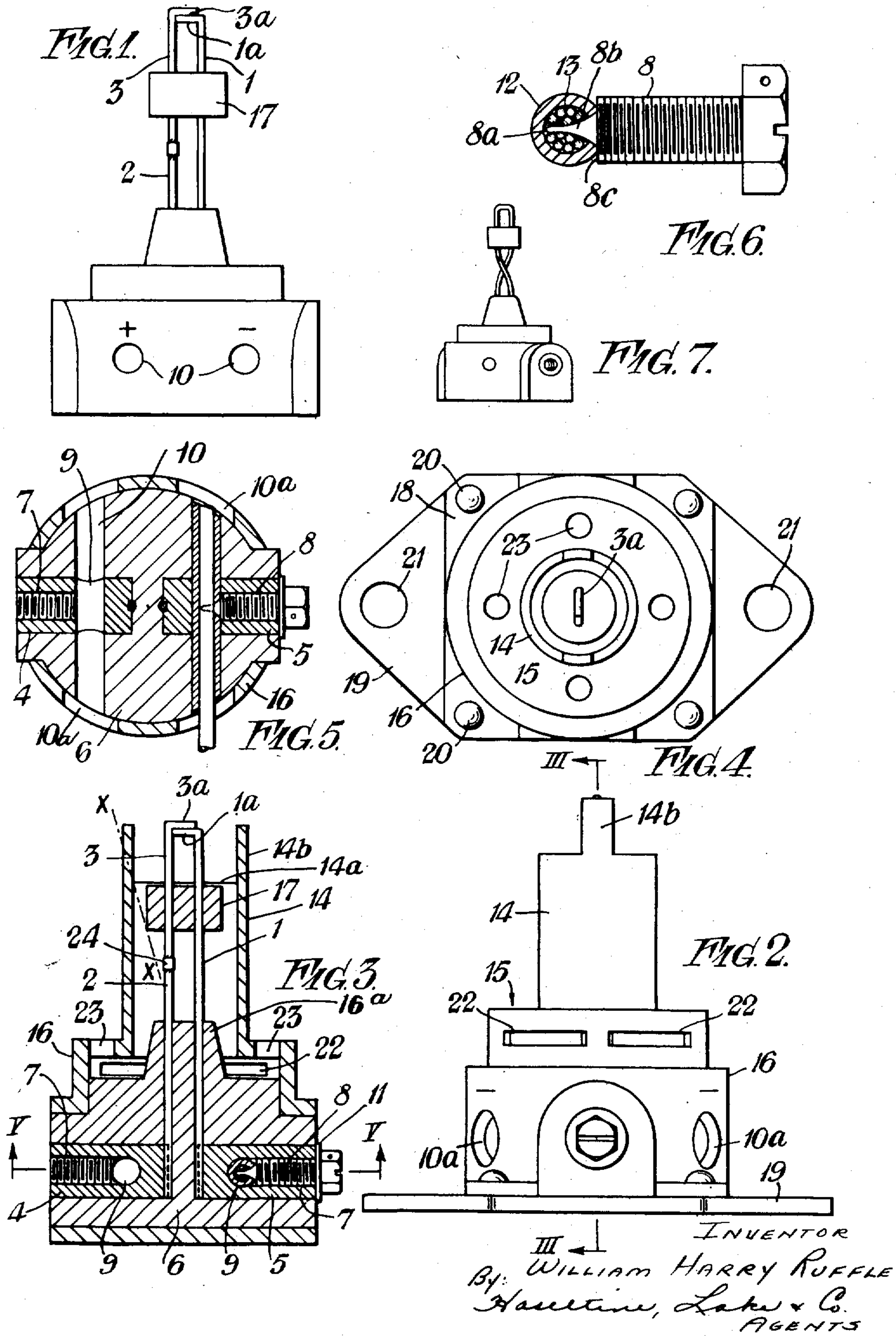
Figure 2 is a side elevation view of Figure 1.
Figure 3 is a sectional elevation of Figure 1 but with the shroud in position.
Figure 4 is a plan view of Figure 3.
Figure 5 is a section on the line V—V of Figure 3.
Figure 6 is a view to a larger scale of a terminal screw and its manner of engaging a lead.
Figure 7 shows a modified configuration of the thermo-couple metallic elements.

Referring to the drawings, the two thermocouples can form parts of two distinctive forms of wire, e. g. two posts of Alumel 1 and 2 of dissimilar length bridged by a length of Chromel wire 3, the upper ends of elements 1 and 3 being cranked inwardly as at 1*a* and 3*a* and united or otherwise brought together at the exposed thermo-couple zone so as to form an elongated inverted U, including the post 2 to the top of which is united the lower end of element 3 by a weld 24. The limbs of this elongated U are engaged with the inner ends of two spaced terminal bushes 4 and 5 and suitably soldered and preferably sealed with a protective coating to prevent moisture and other harmful matter from affecting the proper connection of the two limbs to the terminal sockets. This sealing-in of the said two limbs is further enhanced, or if desired entirely relied upon, by moulding about the posts 2 and 3 a main body 6 of a substance which will not be destroyed by a flame under normal working conditions, and is impervious to the influence of wide changes in weather conditions.

The said body 6 is a block of non-inflammable insulating material and in the preferred form is a shallow cylindrical body, and if the thermocouple posts 2 and 3 are not fitted in-situ during the moulding of such body, the body 6 can be bored axially to receive the said thermo-couple posts, although the former method is preferred.

Embedded in diametrically opposed co-axial relationship in the body 6 are the two terminal bushes 4 and 5. For example the elongated U shaped assembly of thermo-couple elements can be soldered to the inner ends of the terminal bushes and the whole positioned in the mould in which the body 6 is cast. The bushes 4 and 5 can be covered externally with an impermeable coating and can be of circular, square or polygonal cross-section, a square section being useful for positioning them in the mould and keying them firmly in position.

Each bush 4 and 5 has a central threaded bore 7 to receive the appropriate one of a pair of terminal screws 8, and at the inner ends of these bores 7 are located transverse holes 9 aligned with holes 10 in the body 6 to receive the insulation covered ends of the leads as a close fit. The two terminal screws each have a sharp pointed leading end 8*a* comprising the outer extremity of an inwardly radiused or flared part 8*b*, a shoulder 8*c* being formed at the other end of the part 8*b*. The end 8*a* is of elongated pointed conical form so that it will easily penetrate the insulation sheathing 12 of the appropriate lead and pass readily between the strands of wire 13 and ensure that the part 8*b* will engage in and spread the strands of wire, as shown in Figure 6, to ensure good contact without exposing the strands to the harmful effect of moisture or other foreign matter liable to cause short-circuiting or bad conducting value. The shoulder 8*c* can, if so desired, bite against the sheathing and prevent the point 8*a* from passing beyond the sheathing under normal screw pressure. However, washers 11 assist in locking the screws in position, and thickness of these washers and the axial dimension of each screw would normally be such that when a screw is driven fully home its pointed tip 8*a* will not project beyond the sheathing, or at the most will only make a small puncture in the ambient part of the sheathing.

The shroud for the thermo-couples comprises a cylindrical metallic sleeve 14 open at both ends and united integrally at one end with the upper annular part 15 of a housing 16 accommodating the aforesaid insulated body 6. The diameter of this shroud is such as to afford a relatively narrow annular clearance about a cylindrical insulator bead 17, the upper face of which is co-planar, or very nearly co-planar, with the rim 14*a* of the shroud, the bead 17 preferably being composed of the same material as the said body 6 which is threaded by a pair of holes therethrough on to the two limbs of the thermo-couple wire assembly so as to act as a separator from the aforesaid exposed and shrouded parts of the thermo-couples. The sleeve 14 is formed with a diametrically opposed pair of upstanding lugs 14*b* to protect the exposed end of the thermocouple wires from injury. The housing 16 is a relatively concentric cylindrical enlargement of the shroud sleeve 14 and has a square flange 18 at its base upon which is secured by screws 20 a base plate 19 extending beyond opposed parts of the housing and apertured as at 21 to afford a means for readily connecting it to the appropriate part of an aircraft engine or other suitable member. Holes 10*a* in the housing 16 align with the aforesaid holes 10 and are of larger diameter, so that if desired a sealing against can be fused or flowed therein.

It is important that the upper face of the cylindrical bead 17 is substantially co-planar with the rim 14*a* of the shroud 14, the latter being formed at its rim with a pair of diametrically opposed lugs 14*b* which act as guards for the bridge part 1*a*, 3*a* of the thermo-couple. Also, it is important that the weld 24 shall be above the shortest straight line of flow of flame and hot gaseous fluids downwardly into the interior of the shroud 14, this line being indicated at X—X in Figure 3. The weld 24 must be exposed as much as reasonably possible to downward and upward air flow through the shroud whilst obtaining as closely as possible maximum shrouding of the weld by the bead 17, the annular gap Y between the periphery of the bead and the wall of the shroud for most purposes being about one sixteenth of an inch, and the thickness of the bead about three sixteenths of an inch. To ensure adequate free upward or outward circulation of ambient air over the bead, or, in any event, to ensure an easy flow of the ambient air through the shroud in intimate contact with the weld 24 whilst affording a safeguard against flame from an external source impinging on the weld 24 too soon, the housing 16 has a concentric boss part 16*a* which is proud of the insulating body 6 and formed wth air inlet peripheral slots 22 and in its upper annular face with air inlet holes 23.

The use of a single bead 17 concentric with narrow annular clearance from the shroud 14 is of great advantage in ensuring that whilst it considerably restricts the inflow of flame into the shroud it affords adequate clearance for the free flow of air within the shroud. Hence, the interior of the shroud 14 will be fully exposed to the normal ambient condition, although by reason of the said insulating bead 17 on the thermo-couple wires a baffle is provided which will ensure external flame attacking the device first having access effectively with the more exposed parts of thermo-couple. In this connection the latter mentioned slots 22 and apertures 23 in the housing 16 would act to a large extent to muffle ambient flame to prevent the flame from entering the shroud otherwise than from the open end in which is located the exposed thermo-couple.

As the thermo-couple device of the present invention is liable to be subjected to a large amount of vibration during use, e. g. by reason of its fitment to an aircraft engine, it is preferred to twist the two legs 1 and 2, 3 of the elongated inverted U-shaped wires as shown in Figure 7 so that the plane which contains the lower end parts of the limbs is approximately at right angles to the plane which contains the upper end parts of such limbs. By this means the bead 17 is securely held in position and there is considerably less tendency for the wires to vibrate with consequent appreciable avoidance of fatigue.

If desired the housing and heads of the terminal screws can be coated with a weather resisting and non-inflammable enamel or varnish of the type which will not fuse or melt under high temperatures.

I claim:

1. A thermo-couple device intended for developing a very low E.M.F. for actuating a low E.M.F. operable device only when there is a very sudden rise in ambient temperature such as occurs when there is an outbreak of fire close to the thermo-couple device, comprising an insulated base, two thermo-electrically similar metallic wire elements extending into said base, a pair of terminals in said base receiving distinctive ones of said wire elements, a thermo-electrically contrasting metallic wire element bridging the aforesaid two wire elements and forming therewith a substantially elongated U-shaped connection of wires, an insulator through which one of the said pair of elements and also the said contrasting element pass, a tubular shroud open at both ends for the free circulation of air therethrough, an enlargement at one end of said tubular shroud fitted firmly upon and about said base but having a part spaced axially of the shroud from the base, and air inlet slotting in said enlargement between said base and the adjacent end of said shroud, said shroud surrounding said elements and insulator and spaced from said insulator to afford a continuous narrow air inlet gap around the insulator, the junction of the other end of said contrasting element being inside the shroud between the said base and said insulator.

2. A thermo-couple device intended for developing a very low E. M. F. for actuating a low E. M. F. operable device only when there is a very sudden rise in ambient temperature such as occurs when there is an outbreak of fire close to the thermo-couple device, comprising an insulated base, two thermo-electrically similar metallic wire elements extending into said base, a pair of terminals in said base receiving distinctive ones of said wire elements, a thermo-electrically contrasting metallic wire element bridging the aforesaid two wire elements and forming therewith a substantially elongated U shaped connection of wires, an insulator through which one of the said pair of elements and also the said contrasting element pass, a tubular shroud open at both ends for the free circulation of air therethrough, an enlargement at one end of said tubular shroud fitted firmly upon and about said base but having a part spaced axially of the shroud from the base, and air inlet slotting in said enlargement between said base and the adjacent end of said shroud, said shroud surrounding said elements and insulator and spaced from said insulator to afford a continuous narrow air inlet gap around the insulator, the junction of the other end of said contrasting element being inside the shroud between the said base and said insulator, the width of said gap between the shroud and insulator being not more than one half of the thickness of the said insulator, the insulator having an outer or upper face substantially co-planar with the rim of the open end of said shroud remote from said base, and said latter end of the shroud having spaced projections acting as protectors for the median bend of the elongated U shaped assembly of thermo-electrical wires.

3. A thermo-couple device according to claim 2 wherein said shroud is a sleeve open at both ends and at one end is fitted closely about said base and has a part between the base and the part surrounding said wire elements which is apertured for the ingress of ambient air, said apertured part being of larger cross sectional area than the part surrounding said wire elements and formed in its perimeter with relatively very narrow air inlet slots.

4. A thermo-couple device intended for developing a very low E. M. F. for actuating a low E. M. F. operable device only when there is a very sudden rise in ambient temperature such as occurs when there is an outbreak of fire close to the thermo-couple device, comprising a cylindrical metal sleeve open at each end, an elongated U-shaped series connection of two lengths of thermo-electrically similar metallic end wires and an intermediate length of thermo-electrically dissimilar metallic wire, one of the said two similar wires comprising one limb of the U and the other two wires having an end-to-end junction inside said sleeve to form the other limb of the U, the said first mentioned limb having a junction outside one open end of said sleeve with the other end of said dissimilar wire, an insulating base body, a housing member surrounding said base body and forming an enlargement of the inner end of the sleeve, and in which base body are embedded end parts of said similar wires, terminals in said base connected to distinctive ones of the said similar wires, an insulator inside said sleeve and between the said two junctions and through which pass the said two limbs of the U, and air inlet apertures in said enlargement of the inner end of the sleeve between said latter mentioned junction and said base body and, the said sleeve having a clearance from said insulator which affords an endless gap around the insulator, the width of which gap between the periphery of the insulator and said sleeve being less than the thickness of the insulator, the arrangement being such that a straight line joining the rim of the sleeve and the inner side of the insulator will intersect the wire elements between the insulated base and the latter mentioned junction of the wire elements.

5. A thermo-couple device according to claim 4 wherein the said U is of elongated form and is twisted between the ends of its limbs so that the parts of the limbs thereof carrying the said insulator lie in a plane transverse to a plane containing the parts of the limbs between the bead and said base, the twists acting as an abutment for the said insulator.

6. A thermo-couple device according to claim 4 wherein said insulator is a cylindrical bead concentric with respect to said sleeve and with its outer face substantially co-planar with the rim of the open end of said sleeve, the bead having an axial thickness about three times the width of the gap between the sleeve and the bead.

WILLIAM HARRY RUFFLE.

References Cited in the file of this patent

UNITED STATES PATENTS

| Number | Name | Date |
|---|---|---|
| 880,272 | Bristol | Feb. 25, 1908 |
| 2,430,887 | Ray | Nov. 18, 1947 |
| 2,466,274 | Ray | Apr. 5, 1949 |
| 2,563,931 | Harrison | Aug. 14, 1951 |

FOREIGN PATENTS

| Number | Country | Date |
|---|---|---|
| 417,393 | Great Britain | Oct. 4, 1934 |
| 864,964 | France | May 9, 1941 |